United States Patent
Vieira et al.

(10) Patent No.: US 11,362,725 B2
(45) Date of Patent: Jun. 14, 2022

(54) RESHAPING BEAMS OF A BEAM PATTERN

(71) Applicant: Telefonaktiebolaget LM Ericsson (publ), Stockholm (SE)

(72) Inventors: Joao Vieira, Hjärup (SE); Leif Wilhelmsson, Lund (SE); Tai Do, Lund (SE); Peter Alriksson, Hörby (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 17/431,782

(22) PCT Filed: Mar. 12, 2019

(86) PCT No.: PCT/EP2019/056127
§ 371 (c)(1),
(2) Date: Aug. 18, 2021

(87) PCT Pub. No.: WO2020/182295
PCT Pub. Date: Sep. 17, 2020

(65) Prior Publication Data
US 2022/0140885 A1    May 5, 2022

(51) Int. Cl.
*H04B 7/06*    (2006.01)
*H04W 52/34*    (2009.01)
(Continued)

(52) U.S. Cl.
CPC ........... *H04B 7/086* (2013.01); *H04B 7/0617* (2013.01); *H04W 52/346* (2013.01); *H04W 52/42* (2013.01); *H04W 16/14* (2013.01)

(58) Field of Classification Search
CPC ........ H04B 1/04; H04B 7/086; H04B 7/0617; H04B 15/00; H04W 52/346; H04W 52/42; H04W 16/14
See application file for complete search history.

(56) References Cited

U.S. PATENT DOCUMENTS

2007/0046539 A1   3/2007   Mani et al.
2009/0202009 A1*   8/2009   Sandell ................ H04L 5/0023
                                                                                370/329
(Continued)

FOREIGN PATENT DOCUMENTS

WO   WO-2018027677 A1 *   2/2018   ........... H04B 17/102
WO       2018056876 A1     3/2018
WO   WO-2018046080 A1 *   3/2018   ............... H04B 1/04

OTHER PUBLICATIONS

Kuzminskiy, Alexandr M., "Downlink Beamforming Under EIRP Constraint in WLAN OFDM Systems", https://www.researchgate.net/publication/228856100, Jan. 2006, pp. 1-6.

(Continued)

*Primary Examiner* — David S Huang
(74) *Attorney, Agent, or Firm* — Murphy, Bilak & Homiller, PLLC

(57) ABSTRACT

There is provided mechanisms for reshaping individual beams of a beam pattern. A method is performed by a control node. The method comprises determining the beam pattern by distributing available transmission energy in individual beams according to a weighted combination of the individual beams. Different weights are applied for at least two of the individual beams. The weighted combination of individual beams is based on radio propagation channel properties. The method comprises truncating transmission energy of the individual beam with highest transmission energy in the beam pattern to not be over a threshold. The method comprises redistributing the truncated transmission energy among the remaining individual beams in the beam pattern, thereby reshaping the individual beams of the beam pattern.

18 Claims, 9 Drawing Sheets

(51) Int. Cl.
*H04W 52/42* (2009.01)
*H04W 72/04* (2009.01)
*H04B 7/08* (2006.01)
*H04W 16/14* (2009.01)

(56) References Cited

U.S. PATENT DOCUMENTS

| | | |
|---|---|---|
| 2016/0182196 A1 | 6/2016 | Lorca Hernando |
| 2016/0183143 A1* | 6/2016 | Park .................. H04W 16/08 455/436 |
| 2017/0117950 A1 | 4/2017 | Strong |
| 2018/0048373 A1 | 2/2018 | Strong |
| 2019/0036578 A1 | 1/2019 | Zirwas et al. |

OTHER PUBLICATIONS

Paulraj, Arogyaswami, et al., "Introduction to Space-Time Wireless Communications", Cambridge University Press, 2003, pp. 34-36 and 95-96.

* cited by examiner

RESHAPING BEAMS OF A BEAM PATTERN

TECHNICAL FIELD

Embodiments presented herein relate to a method, a control node, a computer program, and a computer program product for reshaping individual beams of a beam pattern.

BACKGROUND

In communication networks, there may be a challenge to obtain good performance and capacity for a given communications protocol, its parameters and the physical environment in which the communication network is deployed.

For example, some communication networks provide mechanisms to support the operation of antenna arrays with a large number of antenna elements, such as having in the order of hundreds or more antenna elements. One capability of such communication networks is that, from a transmission point-of-view, they have the ability to create very focused narrow beams which contain most of the energy available for transmission of signals. The set of possible beams collectively defines a beam pattern. In other words, the beam pattern has a footprint that corresponds to the collective footprint of all the possible beams.

The capability to perform beamforming results in an overall improvement of the efficiency of the communication network both in terms of coverage and throughput. One reason for this is that most of the transmission energy is radiated only in the directions towards the intended receiving nodes (such as served terminal devices in the communication network) or only in the directions in which the transmit signals will eventually reach the receiving nodes. Such type of beamforming schemes are commonly used in licensed frequency bands, since from a regulation point-of-view, one main limitation that exists is on the total transmit power (and not on how this power is radiated). However, in unlicensed frequency bands, there is also a limitation in the equivalent isotropic radiated power (EIRP). In short, the EIRP limitation affects the usage of beamforming, as it imposes a limit on the maximum transmit power density, which is closely related to the maximum power that can be transmitted in a specific direction. In general, this makes the computation of beam patterns for unlicensed frequency bands more challenging than for licensed frequency bands.

Some current options to implement multi-antenna beamforming schemes in EIRP-constrained communication networks will be summarized below.

For example, a transmission and reception point (TRP) can use beams selected from a codebook that should span as much as possible of the region in which network access should be provided by the TRP. This approach is referred to as codebook-based transmission. The beam pattern could be defined by beams based on beam weights in the form of Discrete Fourier Transform (DFT) vectors (i.e. linear phase fronts with no amplitude taper), forming a DFT-like grid-of-beams, uniformly spread in the azimuth plane. One reason for this choice of beams is because most multiple input multiple output (MIMO) channel can be decomposed into a sum of weighted plane waves. Since the structure of the beams (and thus antenna array gain) is known, the TRP is enabled to back-off the transmission energy assigned to each beam in order not to violate the EIRP limit.

Another option is to employ non-codebook-based transmission. Here, the beam pattern may be determined as if no EIRP limit exists. Then the transmit power is backed-off according to the maximum combination of array and antenna gain. This approach is mainly designed to deal with the worst-case EIRP scenario of having a single beam pointing in the direction of the maximum antenna gain, but the advantage is that the EIRP constrain is always satisfied by default.

A further option is to determine the beam pattern as if no EIRP limit exists, but backing-off the transmission power according to the current strongest beam, which requires a few more processing operations than in the previous option.

However, there is still a need for improved beamforming schemes.

SUMMARY

An object of embodiments herein is to provide a beam pattern that enables improvement of the above disclosed beamforming schemes, or at least where the issues of the above disclosed beamforming schemes are avoided, mitigated, or reduced.

According to a first aspect there is presented a method for reshaping individual beams of a beam pattern. The method is performed by a control node. The method comprises determining the beam pattern by distributing available transmission energy in individual beams according to a weighted combination of the individual beams. Different weights are applied for at least two of the individual beams. The weighted combination of individual beams is based on radio propagation channel properties. The method comprises truncating transmission energy of the individual beam with highest transmission energy in the beam pattern to not be over a threshold.

The method comprises redistributing the truncated transmission energy among the remaining individual beams in the beam pattern, thereby reshaping the individual beams of the beam pattern.

According to a second aspect there is presented a control node for reshaping individual beams of a beam pattern. The control node comprises processing circuitry. The processing circuitry is configured to cause the control node to determine the beam pattern by distributing available transmission energy in individual beams according to a weighted combination of the individual beams. Different weights are applied for at least two of the individual beams. The weighted combination of individual beams is based on radio propagation channel properties. The processing circuitry is configured to cause the control node to truncate transmission energy of the individual beam with highest transmission energy in the beam pattern to not be over a threshold. The processing circuitry is configured to cause the control node to redistribute the truncated transmission energy among the remaining individual beams in the beam pattern, thereby reshaping the individual beams of the beam pattern.

According to a third aspect there is presented a control node for reshaping individual beams of a beam pattern. The control node comprises a determine module configured to determine the beam pattern by distributing available transmission energy in individual beams according to a weighted combination of the individual beams. Different weights are applied for at least two of the individual beams. The weighted combination of individual beams is based on radio propagation channel properties. The control node comprises a truncate module configured to truncate transmission energy of the individual beam with highest transmission energy in the beam pattern to not be over a threshold. The control node comprises a redistribute module configured to redistribute the truncated transmission energy among the remaining individual beams in the beam pattern, thereby reshaping the individual beams of the beam pattern.

According to a fourth aspect there is presented a computer program for reshaping individual beams of a beam pattern, the computer program comprising computer program code which, when run on a control node, causes the control node to perform a method according to the first aspect.

According to a fifth aspect there is presented a computer program product comprising a computer program according to the fourth aspect and a computer readable storage medium on which the computer program is stored. The computer readable storage medium could be a non-transitory computer readable storage medium.

Advantageously this provides a beam pattern that easily handles situations where the amount of radiated power, as translated into transmission energy, is limited according to some constraint or restriction, as given by the threshold.

Advantageously, use of the resulting beam pattern results in an increase in the received power, or (receive) signal to noise ratio (SNR), at a marginal increase in computational complexity.

Advantageously, this is an efficient way to increase coverage as well as spectral efficiency since an increased SNR typically translates into that a higher data rate can be supported.

Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, module, step, etc." are to be interpreted openly as referring to at least one instance of the element, apparatus, component, means, module, step, etc., unless explicitly stated otherwise. The steps of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which.

DETAILED DESCRIPTION

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description. Any step or feature illustrated by dashed lines should be regarded as optional.

Figure 1:
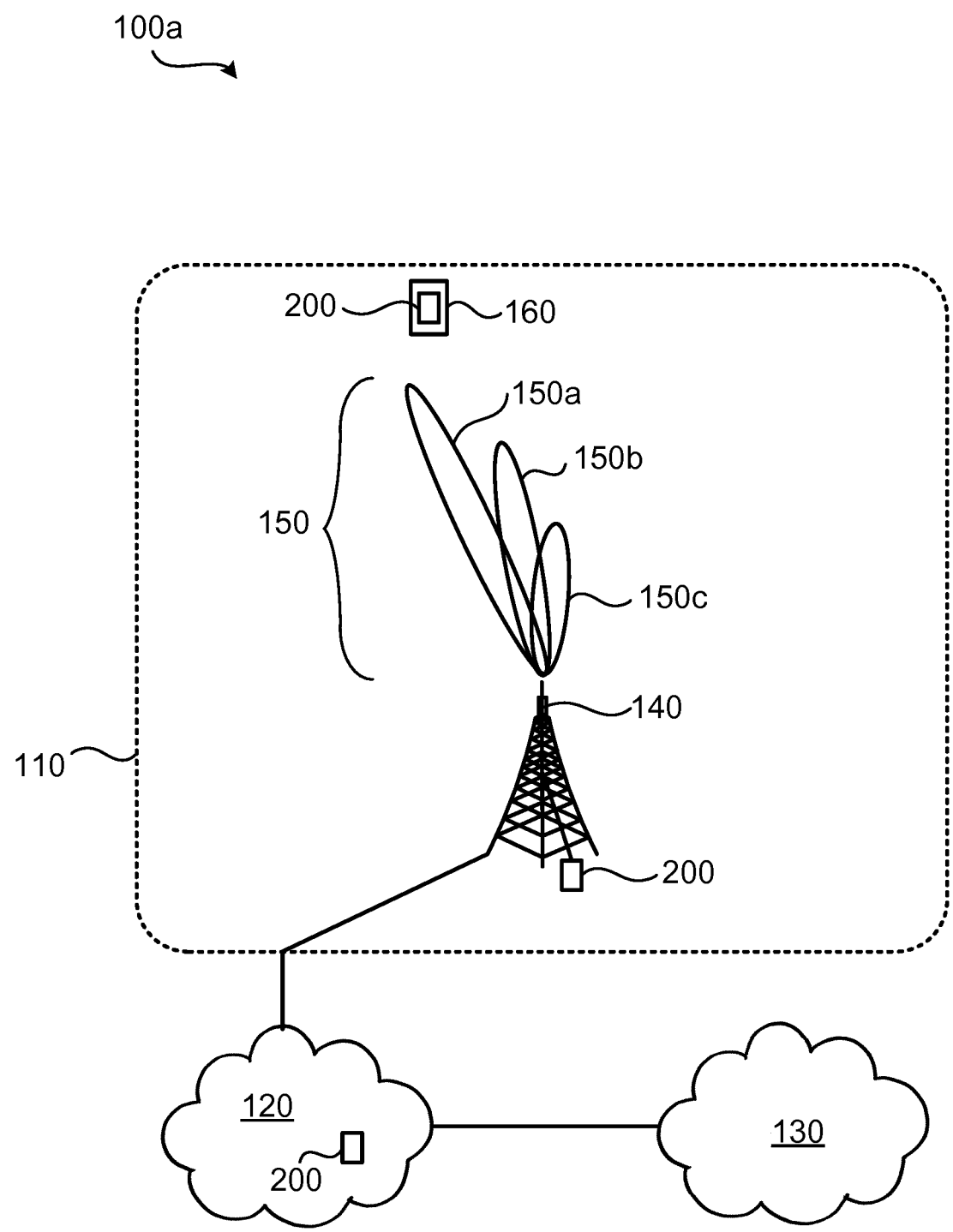
FIGS. 1 and 2 are schematic diagrams illustrating a communications network according to embodiments.

FIG. 1 is a schematic diagram illustrating a communication network 100a where embodiments presented herein can be applied. The communication network 100a comprises a radio access network node 140 configured to provide network access over one or more radio propagation channels to terminal devices, schematically represented by terminal device 160, in a radio access network 110. Non-limited examples of terminal devices 160 are portable wireless devices, mobile stations, mobile phones, handsets, wireless local loop phones, user equipment (UE), smartphones, laptop computers, tablet computers, network equipped sensors, network equipped vehicles, and Internet of Things (IoT) devices. The radio access network node 140 is controlled by a control node 200. Additionally or alternatively, also the terminal device 160 is controlled by a control node 200.

In some embodiments the radio access network node 140 and/or the control node 200 is part of, integrated with, or collocated with a radio base station, base transceiver station, node B (NB), evolved node B (eNB), gNB, access point, TRP, or the like. The radio access network 110 is operatively connected to a core network 120. The core network 120 is in turn operatively connected to a packet data network 130, such as the Internet. The terminal device 160 is thereby, via the radio access network node 140, enabled to access services of, and exchange data with, the service network 130.

The radio access network node 140 communicates with the terminal device 160 in beams 150a, 150b, 150c that are defined by a beam pattern 150. The beams 150a:150c could either be used only for transmission from the radio access network node 140 towards the terminal device 160 or for both transmission from the radio access network node 140 towards the terminal device 160 and reception by the radio access network node 140 from the terminal devices 160. That is, the beams 150a:150c could on the one hand be only TRP TX beams or on the other hand be both TRP TX beams and TRP RX beams. A beam management procedure is performed in order for the control node 200 to select the beam pattern 150. Additionally or alternatively, also the terminal device 160 could communicate with the radio access network node 140 in beams (not shown). Thus, although some of the below examples and embodiments are be disclosed with respect to the control node 200 controlling a beam pattern 150 of the radio access network node 140, the same examples and embodiments apply also for a control node 200 controlling a beam pattern of the terminal device 160.

As noted above, there is still a need for improved beamforming schemes, especially in the presence of constraints, such as EIRP, on radiated power.

One issue with the above summarized approaches for beamforming is that, when applied to unlicensed frequency bands, they typically deal with the EIRP constraints by backing-off the transmission energy of an already determined beam pattern 150. At best, the factor according to which the transmission energy is backed-off is determined according to the strongest beam. As a result, the shape of the beam pattern 150 does not change; it is only scaled. This typically results in a sub-optimal beam pattern 150 since there could exist other transmit directions (than the main one) that, if transmission energy was steered to, the received signal energy could still be improved (without violating the EIRP constraint at the transmitter). In this case, the resulting beam pattern 150 would not only be scaled but also change its shape as a function the angular profile of the radio propagation channel, available transmit power and the EIRP limit.

For illustrative, but non-limiting, purposes it is assumed that the radio access network node 140 is equipped with linear antenna array with M antenna elements and that the terminal device 160 is equipped with one single antenna. The radio access network node 140 has access to a noisy estimate $\hat{h}$ of the 1-by-M downlink multiple-input single output (MISO) channel vector h, where $\hat{h}$=h+n, and where n represents noise. The estimate $\hat{h}$ can be obtained, e.g., by means of uplink reference signals as transmitted by the terminal device 160 and assuming reciprocity, or alternatively, the radio access network node 140 can sound a grid-of-beams (GoB) in the downlink and request the terminal device 160 to report the amplitude and phase associated with the strongest measured beams.

For illustrative, but non-limiting, purposes it is further assumed that the channel vector h is modeled as a weighted sum of plane waves. That is:

$$h = \sqrt{M} \sum_{i=1}^{L} a_i e(\theta_i)^T, \quad (1)$$

The angles of the plane waves are represented by $\theta_i$, which are mutually independent and are drawn from a uniform distribution with support from 0 to $2\pi$. Further, $(\theta_i)=$ $$\left[1 \; e^{\frac{i\pi}{M} sin(\theta_i)} \; ... \; e^{\frac{i\pi(M-1)}{M} sin(\theta_i)}\right]^T / \sqrt{M}$$

is the steering vector which points at angle $\theta_i$. The factor $\sqrt{M}$ ensures that each entry of the channel matrix has a variance of $\Sigma V_i$. Further, $\alpha_i$ are zero-mean independent complex Gaussian coefficients with variance $V_i$, and L is the number of simultaneous radio propagation channel paths. In a millimeter wave scenario, L is small; typically L≤10. As an example, in an outdoor scenario with dominant line of sight (LOS) path and ground reflection, L=2.

In networks that have constraints on maximum transmitted power rather than on EIRP, e.g. networks that operate in licensed frequency bands, the optimal beamforming approach to maximize the received signal power for a given transmit power in MISO channels is called Maximum Radio Transmission (MRT). The SNR optimization problem for MRT for finding an optimal beam pattern 150 can be formulated as:

$$b_{MRT} = \underset{b}{\operatorname{argmax}} \; |hb|^2 \quad (2)$$
$$s.t. \; b^H b = E_{total}$$

Here, $b_{MRT}$ is the optimal beam pattern 150 in terms of MRT. The solution to equation (2) is a scaled version of the complex conjugate of h, namely, $b_{MRT}=\sqrt{E_{total}}h^*$, where $E_{total}$ is a scaling factor representing the total energy available for transmission.

Figure 2:
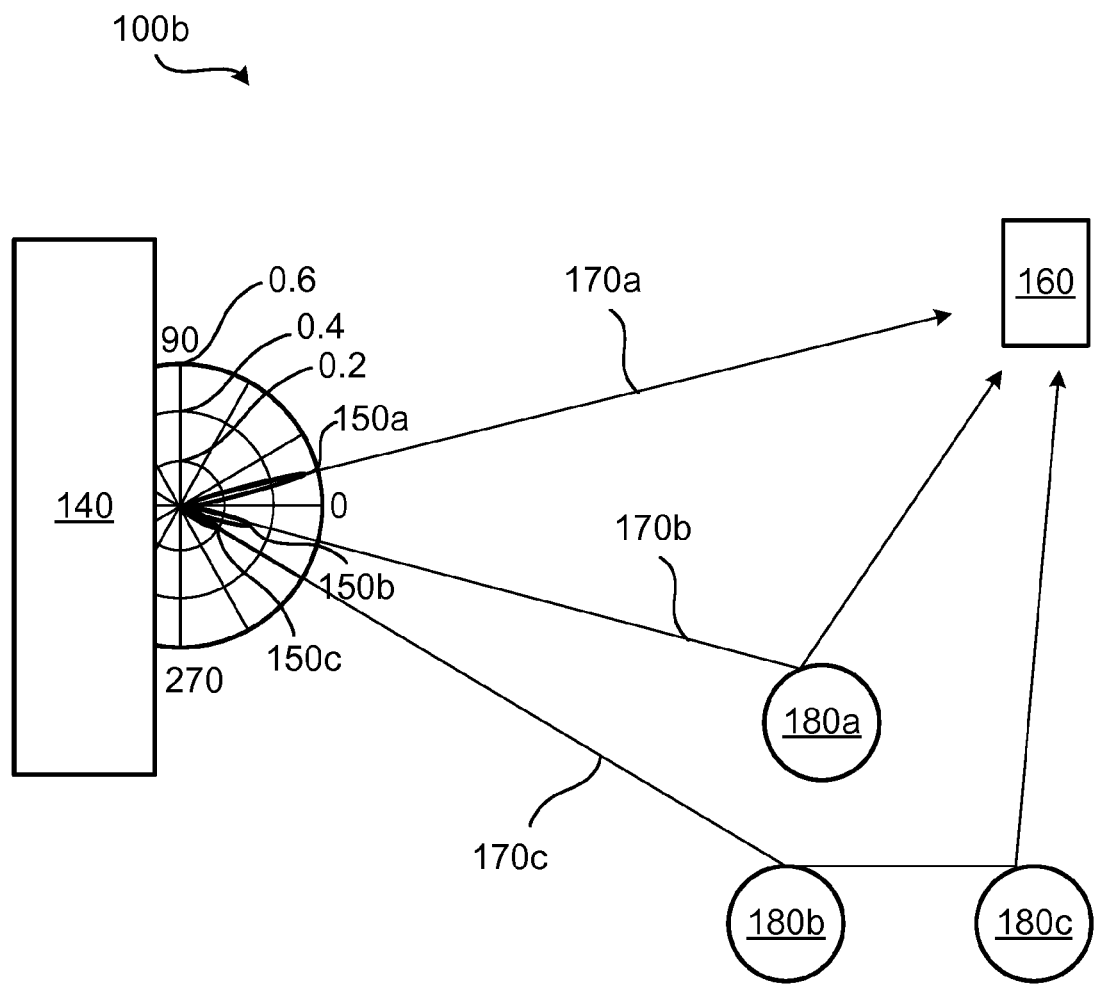

FIG. 2 schematically illustrates a communication network 100b including the radio access network node 140 and the terminal device 160 of the communication network 100a of FIG. 1. In more detail, FIG. 2 illustrates the angular distribution of transmission energy of the MRT beam pattern 150, in a scenario where the radio propagation channel has three distinct channel paths 170a, 170b, 170c. Objects in which the transmission channel can be reflected are illustrated at 180a, 180b, and 180c. There are three beams; 150a, 150b, 150c in the optimal beam pattern 150: one beam per channel path 170a, 170b, 170c. The higher the path gain, the higher energy of that beam. Denote the gain of path 170a by $|\alpha_1|$, the gain of path 170b by $|\alpha_2|$, and the gain for path 170c by $|\alpha_3|$ The gains are assumed to satisfy $|\alpha_1|>|\alpha_2|>|\alpha_3|$.

The beam pattern 150 only comprises beams in the directions where the signals will eventually reach the terminal device 160. According to MRT, it is not necessarily optimal to form a beam pattern 150 where all the total transmission energy is concentrated in one single beam 150a defined by the best channel path 170a. Instead, the transmission energy is allocated to beams in all channel paths, but where the amount of transmission energy allocated to a beam in a specific channel path depends on its gain relative to the other channel paths. For example, in FIG. 2, if $|\alpha_1|=0.5$, $|\alpha_2|=0.25$, and $|\alpha_3|0.15$, then $|\alpha_1|/\Sigma\alpha_i \approx 55\%$ of the total transmission energy is assigned to the first beam 150a, approximately 28% of the total transmission energy is assigned to the second beam 150b, and approximately 17% of the total transmission energy is assigned to the third beam 150c. Thus, regardless of the total amount of available transmission energy at hand, this ratio of beamformed energies remains constant and the overall beam shape of the beam pattern 150 does not change; it can only be scaled according to the transmit power. This is optimal in the absence of limitations of the EIRP.

The MRT approach can be straightforwardly applied in EIRP-constrained networks that operate with a large amount of energy available for transmission, by backing-off the transmission energy according to some criteria. However, backing-off the transmit energy in order to meet the EIRP limit might not be optimal, since not all available transmission energy might be used.

In further detail, assume that the cost function to be optimized is the received signal power or SNR with a limitation on the EIRP. The optimization problem for finding an optimal beam pattern 150 for this scenario is similar to that of equation (2) but with a new constraint, namely:

$$b_{EIRP} = \underset{b}{\operatorname{argmax}} \; |hb|^2 \quad (3)$$
$$s.t. \; b^H b = E_{total}$$
$$|e(\theta)b|^2 \le EIRP_{limit}, \forall \theta \in [0, 2\pi]$$

Here, $b_{EIRP}$ is the optimal beam pattern 150 for MRT under constraints for limitations of EIRP as given by $EIRP_{limit}$. According to the constraints, the transmission energy of none of the beams 150a:150c in the beam pattern 150 thus is allowed to exceed $EIRP_{limit}$.

By comparing equation (2) to equation (3), it is recognized that MRT precoding in EIRP-constrained systems can still be optimal, i.e. $b_{MRT}=b_{EIRP}$, as long as $e(\theta) b_{MRT}^2 \leq EIRP_{limit}$, $\forall\, \theta \in [0,2\pi]$. This is the case when the total amount of available transmission energy is rather small. However, when the constraints for EIRP need to be considered, solving equation (3) becomes more complicated: there is no closed-form or simple solution for this equation, and numerical solving methods need to be used, which may not be practical.

The herein disclosed embodiments can be used to efficiently determine a multi-antenna transmit beam pattern 150 in an EIRP-constrained network. In some aspects, the proposed beam pattern 150 can be expressed as the sum of multiple controllable beams 150a:150c, where the transmission energy sent of each beam 150a:150c is explicitly controlled. Let the $i^{th}$ beam be denoted as $c_i e(\phi_i)$, where $c_i$ is the complex amplitude of the beam. The beam pattern 150 if expressed mathematically as $b_{EIRP,E}$ can the be written as:

$$b_{EIRP,E} = (E_{total}, EIRP_{limit}) = \sum_{i=1}^{N_b} c_i(E_{total}, EIRP_{limit}) e(\phi_i). \quad (4)$$

The resulting beam pattern 150 of equation (4) is thus a function of the total available transmission energy $E_{total}$ and the EIRP limit value $EIRP_{limit}$, in the sense that the transmission energy allocated to each individual beam (i.e., $|c_k|^2$ for the $k^{th}$ beam) in the beam pattern 150 is optimized accordingly. As much transmission energy as possible can be distributed across the beams in order to maximize the received signal energy and/or coverage at the terminal device 160 without violating the EIRP limit at the radio access network node 140.

The embodiments disclosed herein in particular relate to mechanisms for reshaping individual beams 150a:150c of a beam pattern 150. In order to obtain such mechanisms there is provided a control node 200, a method performed by the control node 200, a computer program product comprising code, for example in the form of a computer program, that when run on a control node 200, causes the control node 200 to perform the method.

Figure 3:
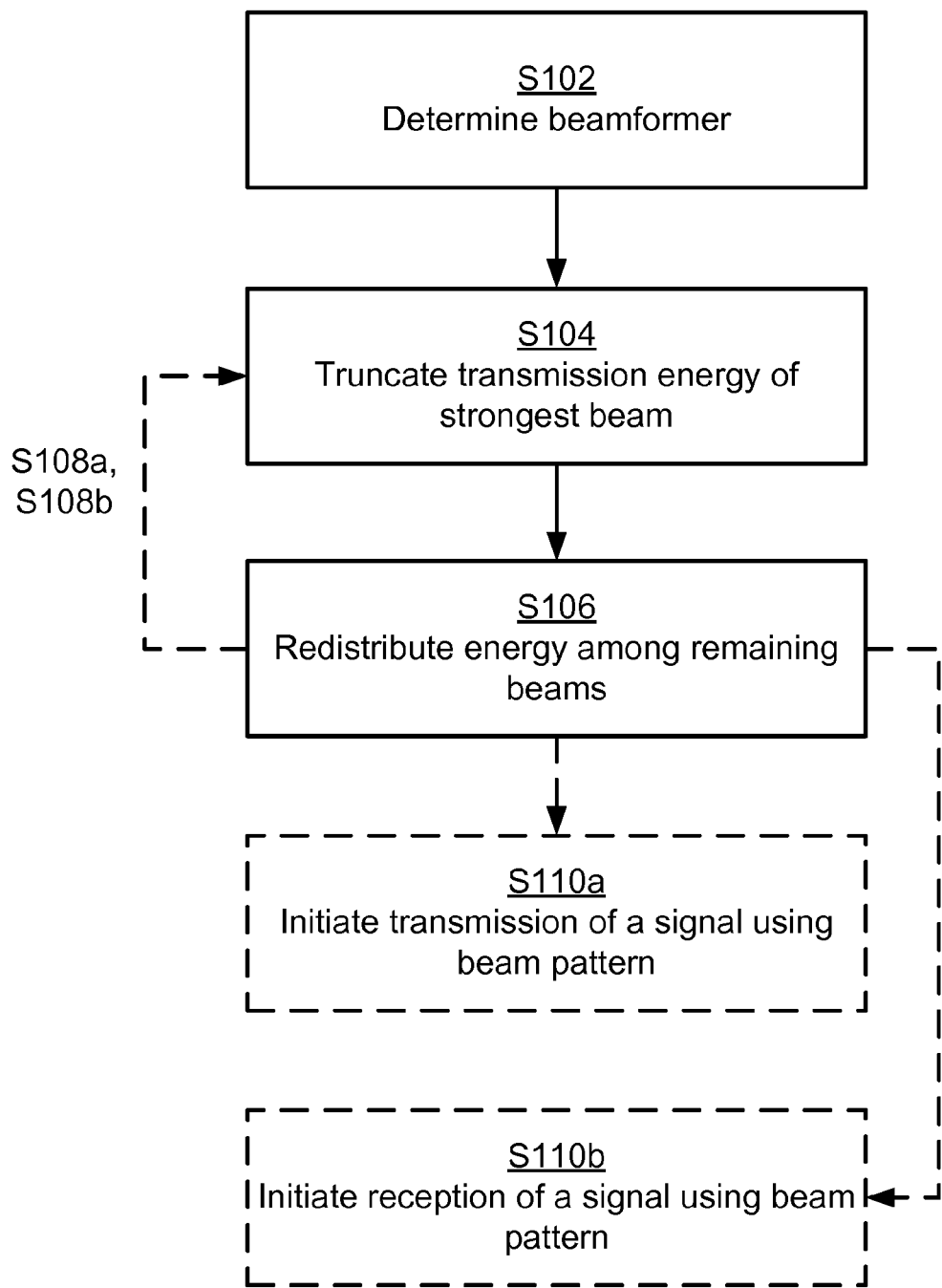
FIGS. 3 and 4 are flowcharts of methods according to embodiments.

FIG. 3 is a flowchart illustrating embodiments of methods for reshaping individual beams 150a:150c of a beam pattern 150. The methods are performed by the control node 200. The methods are advantageously provided as computer programs 1020.

A nominal beam pattern 150 is first determined. Hence, the control node 200 is configured to perform step S102:

S102: The control node 200 determines the beam pattern 150 by distributing available transmission energy in individual beams 150a:150c according to a weighted combination of the individual beams 150a:150c. Different weights are applied for at least two of the individual beams 150a: 150c. The weighted combination of individual beams 150a: 150c is based on radio propagation channel properties.

It is assumed that the transmission energy of at least one of the individual beams 150a:150c of the determined beam pattern 150 is above a threshold. The control node 200 therefore truncates the transmission energy. Particularly, the control node 200 is configured to perform step S104:

S104: The control node 200 truncates transmission energy of the individual beam 150a with highest transmission energy in the beam pattern 150 to not be over a threshold. The thus truncated transmission energy is then redistributed such that as little reduction of total transmission power as possible is achieved. Hence, the control node 200 is configured to perform step S106:

S106: The control node 200 redistributes the truncated transmission energy among the remaining individual beams 150b, 150c in the beam pattern 150, thereby reshaping the individual beams 150a:150c of the beam pattern 150.

Thus, in this respect the individual beams 150a:150c of the beam pattern 150 are reshaped by the transmission energy being redistributed among the individual beams 150a:150c. The pointing directions and beam widths of the individual beams 150a:150c are kept unaltered. That is, the individual beams 150a:150c are reshaped without their beam widths being altered and without their pointing directions being altered. That is, the individual beams 150a:150c whilst keeping their individual beam widths and individual pointing directions unaltered.

Embodiments relating to further details of reshaping individual beams 150a:150c of a beam pattern 150 as performed by the control node 200 will now be disclosed.

In some aspects the herein disclosed embodiments are applied to unlicensed frequency bands.

That is, according to an embodiment, the beam pattern 150 is determined for transmission of signals in an unlicensed frequency band.

Although EIRP has been given as one example of a constraint according to which radiation should not be exceeded, the herein disclosed embodiments are applicable also for scenarios where other constraints are applied. In particular, according to an embodiment, the threshold is defined in terms of maximum allowed transmit power density. According to some non-limiting examples, the threshold is defined in terms of one of EIRP, electromagnetic field (EM field or EMF) constraints, electromagnetic compatibility (EMC) constraints, electromagnetic radiation (EM radiation or EMR) constraints, or constraints from the International Commission on Non-Ionizing Radiation Protection (ICNIRP).

There may be different ways for the truncated transmission energy to be redistributed among the remaining individual beams 150b, 150c in the beam pattern 150, as in step S106.

In some aspects the transmission energy ratio is preserved among the remaining individual beams 150b, 150c during the redistribution in step S106. That is, according to an embodiment, the remaining individual beams 150b, 150c, according to the beam pattern 150, have transmission energies distributed according to a transmission energy ratio, and, wherein the transmission energy is redistributed among the remaining individual beams 150b, 150c to preserve the transmission energy ratio of these remaining individual beams 150b, 150c.

In some aspects the transmission energy is in step S106 redistributed such that the transmission energy of none of the remaining individual beams 150b, 150c exceeds the threshold. That is, according to an embodiment, the transmission energy is redistributed among the remaining individual beams 150b, 150c such that the truncated transmission energy is added to those remaining beams 150b, 150c not having their transmission energy over the threshold and such that none of the truncated transmission energy is added to any remaining individual beam 150b, 150c having transmission energy above the threshold. In this respect, if, at the outset, for all individual beams 150a:150c the transmission energy is above the threshold, the truncated energy would not be redistributed to any of the remaining individual beams and thus it might be assumed that at the outset there is at least one of the individual beams 150a:150c for which the transmission energy is below the threshold. However, in other aspects, the truncated transmission energy is redistributed to a remaining individual beam 150b, 150c even if the transmission energy for at least one of these remaining individual beams 150b, 150c already is above the threshold. In a next iteration step this excess transmission energy will be truncated and redistributed (see below).

In some aspects the transmission energy is truncated (as in above step S104) and redistributed (as in above step S106) in an iterative fashion for the remaining individual beams 150b, 150c until there are no more individual beams remaining with transmission energy above the threshold. That is, according to an embodiment, the control node 200 is configured to perform (optional) step S108a:

S108a: The control node 200 repeats the step S104 of truncating transmission energy and the step S106 of redistributing the truncated transmission energy until no individual beam 150a:150c in the beam pattern 150 has its transmission energy larger than the threshold.

In further detail, beams for which the transmission energy already has been truncated are excluded from the iterative procedure. That is, according to an embodiment, the control node 200 is configured to perform (optional) step S108b:

S108b: The control node 200 repeats, when any of the remaining individual beams 150b, 150c of the beam pattern 150 has transmission energy above the threshold, the step S104 of truncating transmission energy and the step S106 of redistributing the truncated transmission energy but with the strongest remaining individual beam 150c as strongest beam, and without any individual beam 150a for which the transmission energy has been truncated.

There could be different ways to determine the beam pattern 150. As exemplified above, the beam pattern 150 could be determined according to MRT. However, there could be alternative ways according to which the beam pattern 150 could be determined. In particular, according to an embodiment, when determining the beam pattern 150 in step S102, the available transmission energy is distributed among the individual beams 150a:150c according to maximum ratio transmission (MRT) or eigen beamforming, or minimum mean square error (MMSE) beamforming. In this respect, according to MRT beamforming, the complex-valued weights of the individual beams 150a:150c correspond to the complex-conjugate of the weights of the radio propagation channel paths. According to MMSE beamforming the complex-valued weights of the beams correspond to scaled versions of the complex-conjugate of the weights of the radio propagation channel paths. For each path, the scaling factor depends on statistical knowledge of the radio propagation channel, as the noise, and other properties of the radio propagation channel might vary over time.

There could be different ways for the control node 200 to obtain knowledge of the radio propagation channel in which the beam pattern 150 is going to be used, and thus there might be different types of radio propagation channel properties. According to a first example, the radio propagation channel properties are represented by a complete set of complex coefficients and angles of signal paths of the radio propagation channel. According to a second example, the radio propagation channel properties are estimated from of a single measurement, or from more than one measurement, of the radio propagation channel.

There could be different kinds of use of the beam pattern 150 once the transmission energy has been redistributed.

In some aspects the beam pattern 150 is used for transmission of signals from the radio access network 140 towards terminal devices 160. That is, according to an embodiment, the control node 200 is configured to perform (optional) step S110a:

S110a: The control node 200 initiates transmission of a signal using the beam pattern 150 after having redistributed the truncated transmission energy.

In some aspects the beam pattern 150 is used for reception of signals by the radio access network 140 from terminal devices 160. That is, according to an embodiment, the control node 200 is configured to perform (optional) step S110b:

S110b: The control node 200 initiates reception of a signal using the beam pattern 150 after having redistributed the truncated transmission energy.

Figure 4:
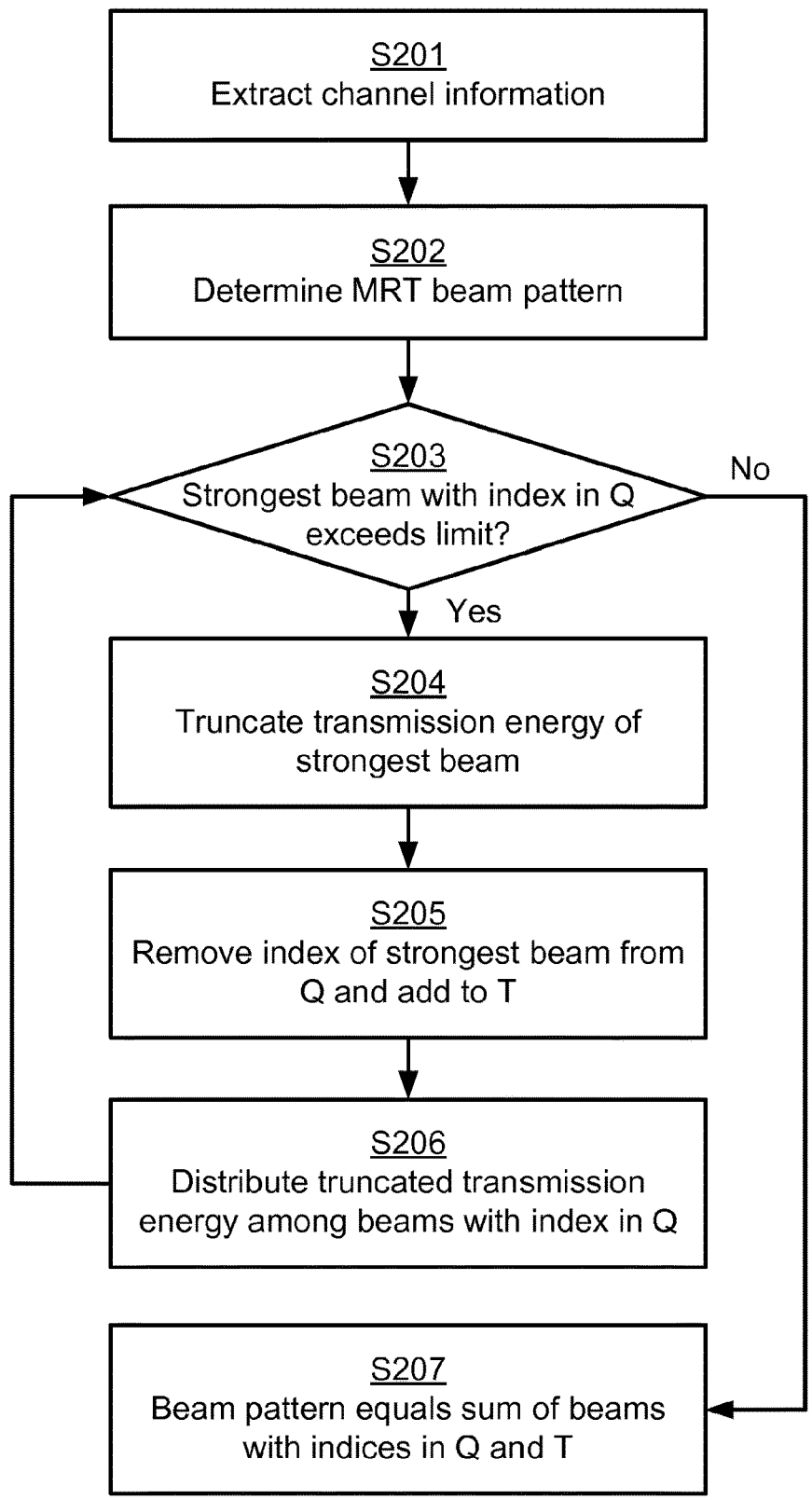

FIG. 4 is a flowchart of a method for reshaping individual beams 150a:150c of a beam pattern 150 as performed by the control node 200 according to one particular embodiment as based on at least some of the above disclosed embodiments.

A set $Q=\{1, 2, \ldots, N_b\}$ of beam indices for beams not having been truncated is set, where $N_b$ denotes the total number of beams in the beam pattern 150. A set $T=\{ \}$ of beam indices for beams having been truncated is also set. The set T is initially empty.

S201: Channel conditions of the radio propagation channel are obtained.

S202: The beamforming weights are determined by being set to the complex conjugate of their respective channel coefficients using all available transmit energy (as in an unconstrained MRT scenario).

Steps S203-S207 are then performed in an iterative manner, as needed.

S203: It is checked whether the transmission energy of the strongest individual beam in the set Q exceeds the threshold. If yes, step S204 is entered. If no, step S207 is entered.

S204: The transmission energy of the strongest individual beam in the set Q is truncated such that the transmission energy of the strongest individual beam is not over the threshold.

S205: The beam index for the individual beam for which the transmission energy was truncated in step S204 is removed from the set Q and added to the set T.

S206: The transmission energy as truncated in step S204 is redistributed among those remaining individual beams with beam indices still in the set Q. Step S203 is then entered again.

S207: The beam pattern 150 equals the sum of the beams with beam indices belonging to both the set Q and the the set T (i.e., the union of these sets).

At the end, the transmission energy of each individual beam 150a:150c in the beam pattern 150 is not over the threshold.

Figure 5:
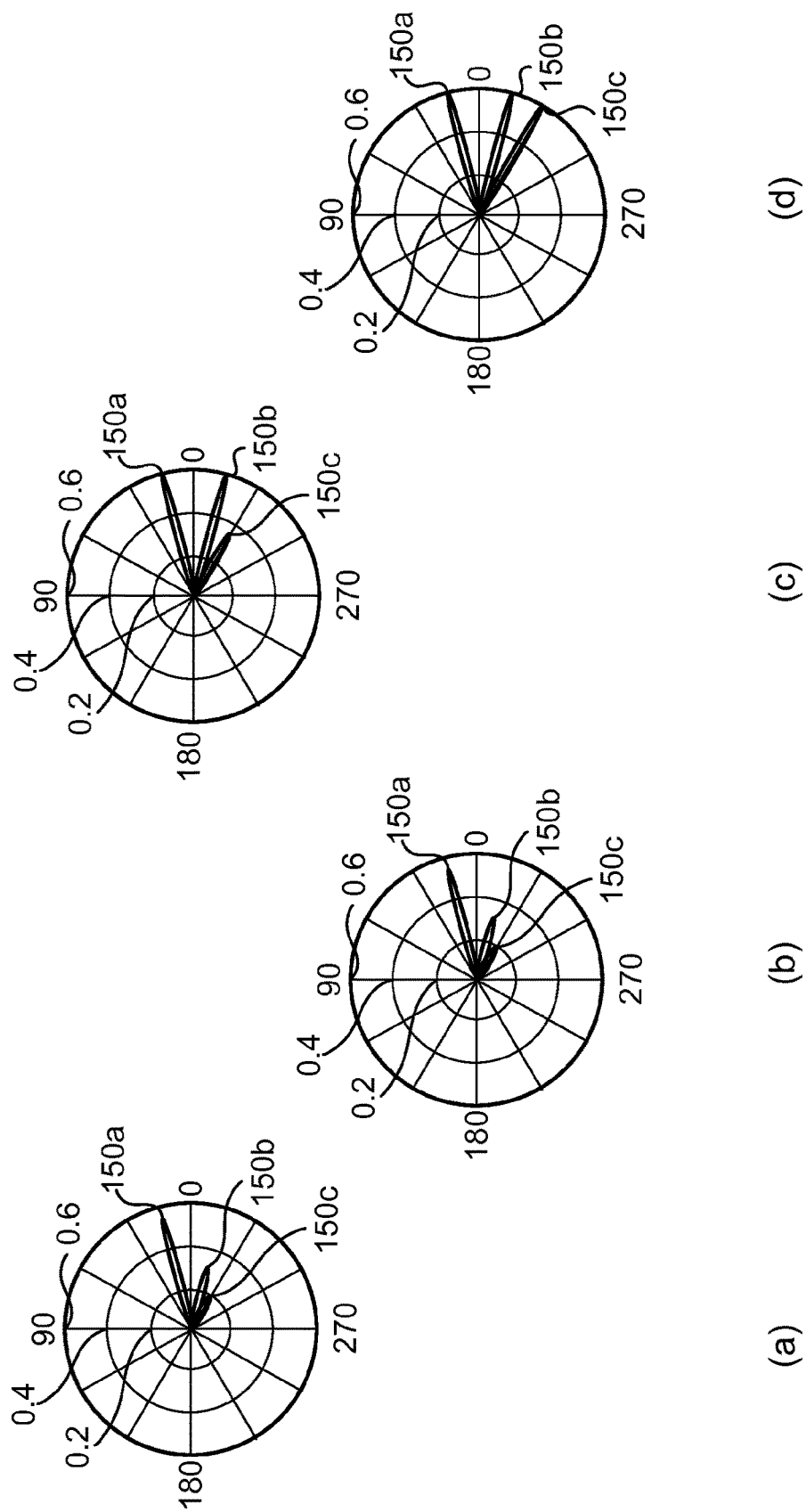
FIG. 5 schematically illustrates distributions of transmission energy in individual beams according to embodiments.

FIG. 5 schematically illustrates examples of distributions of transmission energy in individual beams 150a:150c, after the disclosed energy allocating procedure has finished, and where the threshold is set to 0.6. FIG. 5 at (a), (b), (c), and (d) illustrates different possible outcomes of performing the method according to steps S201-S207. In a scenario of having low transmission energy available, none of the individual beams are constrained by the threshold and thus the optimal beam pattern 150 is given by MRT, as in FIG. 5(a). If more transmission energy is available, then the transmission energy is increased across all individual beams 150a:150c whilst keeping the ratio of transmission energies between the individual beams 150a:150c constant as long as the transmission energy of all individual beams 150a:150c is less than the threshold, as in FIG. 5(b). If the transmission energy of the strongest individual beam 150a is above the threshold, the transmission energy of this strongest beam is truncated and redistributed among the remaining individual beams 150b, 150c, whilst maintaining the ratio between their transmission energies, as in FIG. 5(c). If the transmission energy of also the second strongest individual beam 150c is above the threshold, the transmission energy of this second strongest beam is truncated and redistributed among the remaining individual beam 150c. In general terms, if still more transmission energy is available, this procedure continues until either i) there is no more transmission energy available, or until ii) all individual beams meet the threshold, as in FIG. 5(d).

Figure 6:
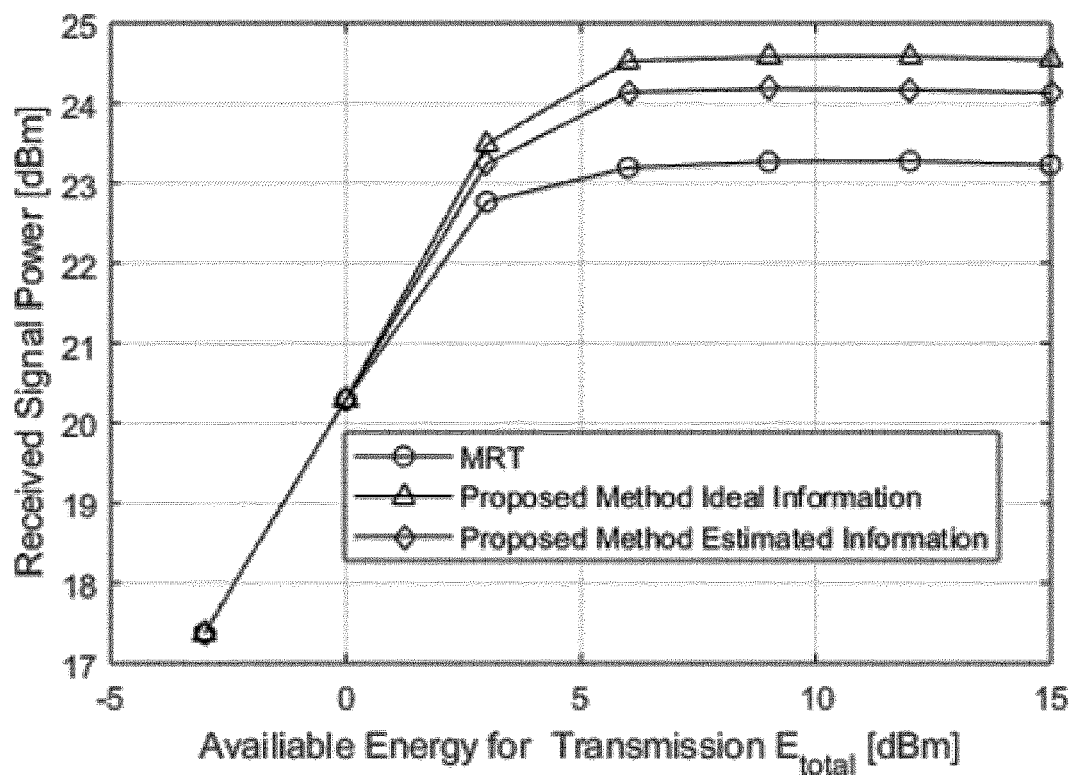
FIGS. 6 and 7 illustrate simulation results according to embodiments.
Figure 7:
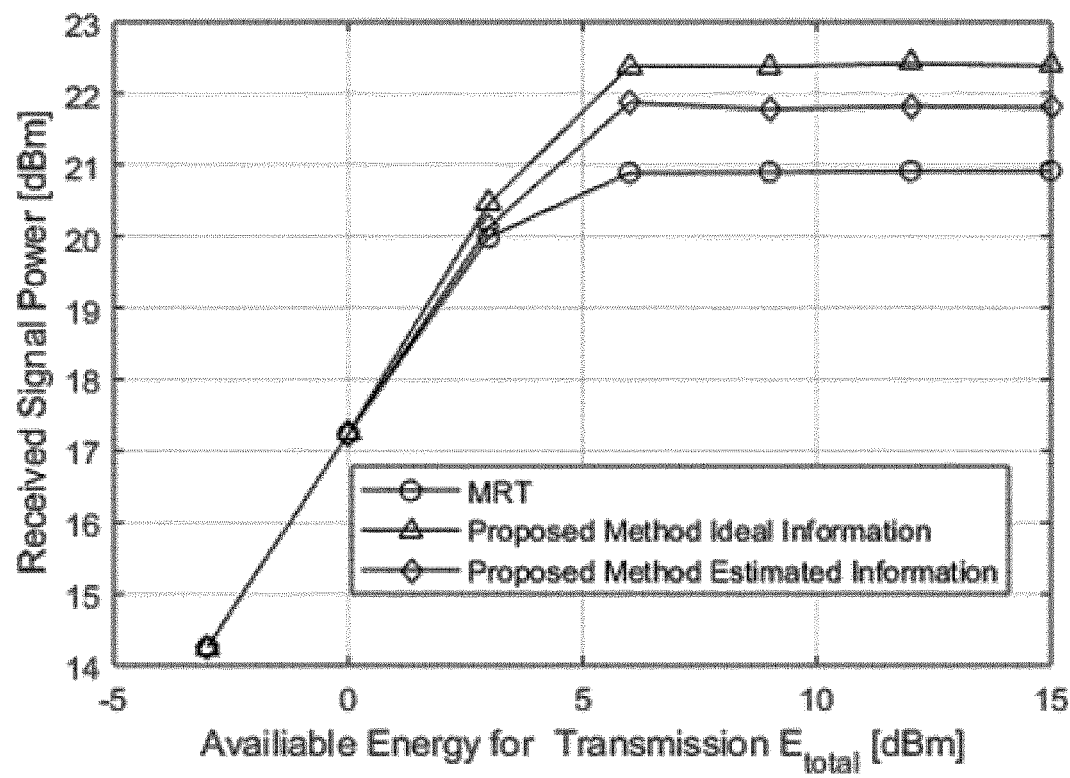

Simulation results will now be presented with reference to FIG. 6 and FIG. 7 where the threshold is defined by $EIRP_{limit}$. The performance of traditional MRT beamforming where transmission energy is backed-off according to the transmission energy of its strongest individual beam 150a is used as a baseline for comparison with the performance of the herein disclosed embodiments.

The performance is presented for two different cases of information of radio propagation properties; one case where the transmitting node has perfect knowledge of the complex coefficients and angles of the radio propagation channel, and another case where the complex coefficients and angles are estimated from a single channel measurement using a simple channel estimator. In the latter case, the estimator first performs an oversampled discrete Fourier transform (DFT) of $h^T$ in order to obtain $h'=Fh^T$, where F corresponds to an over-sampled DFT operator. Then, estimates of $\{\theta_i\}_i^L$ and $\{\alpha_i\}_i^L$ are obtained by the location and complex amplitude associated with the L dominant peaks of $|h'|$.

FIG. 6 shows the performance of the expected receive signal energy, denoted $E\{|hb|^2\}$, which is proportional to the receive signal to noise ratio (SNR), for the three methods described above. At low available transmission energy (compared to $EIRP_{limit}$) there is no gain since the EIRP constraint will never be active and therefore effectively the allocation of transmission energy for the individual beams will not be affected. However, when the available transmission energy exceeds $EIRP_{limit}$ then the performance starts to differ, and when a high amount of transmission energy is available, about 1.2 dB gain in received signal power can be obtained.

FIG. 7 shows the performance for a different setup with less number of antennas at the radio access network node 140 and more radio propagation channel paths (with different variances) than in FIG. 6. Overall, the same gain of 1 dB is obtained at high enough transmission energies.

The gain of the herein proposed methods over MRT seems to be consistent and expectable in many radio propagation channel scenarios. According to Friis' transmission formula (also denoted Friis' transmission equation or Friis' law, the free space pathloss model states that the received power decreases with $$\left(\frac{\lambda}{4\pi d_2}\right)^2,$$

where λ is the wavelength, where d is the propagation distance. From the expression:

$$1 dB \approx 10 \log_{10}\left(\left(\frac{\frac{\lambda}{4\pi d_2}}{\frac{\lambda}{4\pi d_1}}\right)^2\right) = 20 \log_{10}\left(\frac{d_1}{d_2}\right),$$

it is implied that $d_1/d_2 \approx 1.15$. Thus this 1 dB gain translates approximately into 15% of coverage enhancement. This is a good coverage enhancement compared to the small extra processing needed to determine the beam pattern 150. Thus, the herein disclosed embodiments provide an efficient way to increase coverage and/or throughput.

Figure 8:
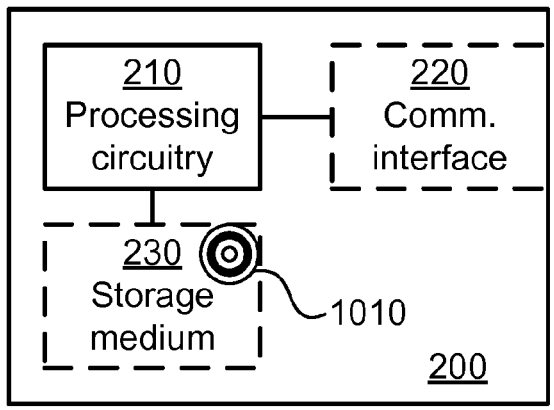
FIG. 8 is a schematic diagram showing functional units of a control node according to an embodiment.

FIG. 8 schematically illustrates, in terms of a number of functional units, the components of a control node 200 according to an embodiment. Processing circuitry 210 is provided using any combination of one or more of a suitable central processing unit (CPU), multiprocessor, microcontroller, digital signal processor (DSP), etc., capable of executing software instructions stored in a computer program product 1010 (as in FIG. 10), e.g. in the form of a storage medium 230. The processing circuitry 210 may further be provided as at least one application specific integrated circuit (ASIC), or field programmable gate array (FPGA).

Particularly, the processing circuitry 210 is configured to cause the control node 200 to perform a set of operations, or steps, as disclosed above. For example, the storage medium 230 may store the set of operations, and the processing circuitry 210 may be configured to retrieve the set of operations from the storage medium 230 to cause the control node 200 to perform the set of operations. The set of operations may be provided as a set of executable instructions.

Thus the processing circuitry 210 is thereby arranged to execute methods as herein disclosed.

The storage medium 230 may also comprise persistent storage, which, for example, can be any single one or combination of magnetic memory, optical memory, solid state memory or even remotely mounted memory. The control node 200 may further comprise a communications interface 220 at least configured for communications with other entities, functions, nodes, and devices of the communication network of FIG. 1. As such the communications interface 220 may comprise one or more transmitters and receivers, comprising analogue and digital components. The processing circuitry 210 controls the general operation of the control node 200 e.g. by sending data and control signals to the communications interface 220 and the storage medium 230, by receiving data and reports from the communications interface 220, and by retrieving data and instructions from the storage medium 230. Other components, as well as the related functionality, of the control node 200 are omitted in order not to obscure the concepts presented herein.

Figure 9:
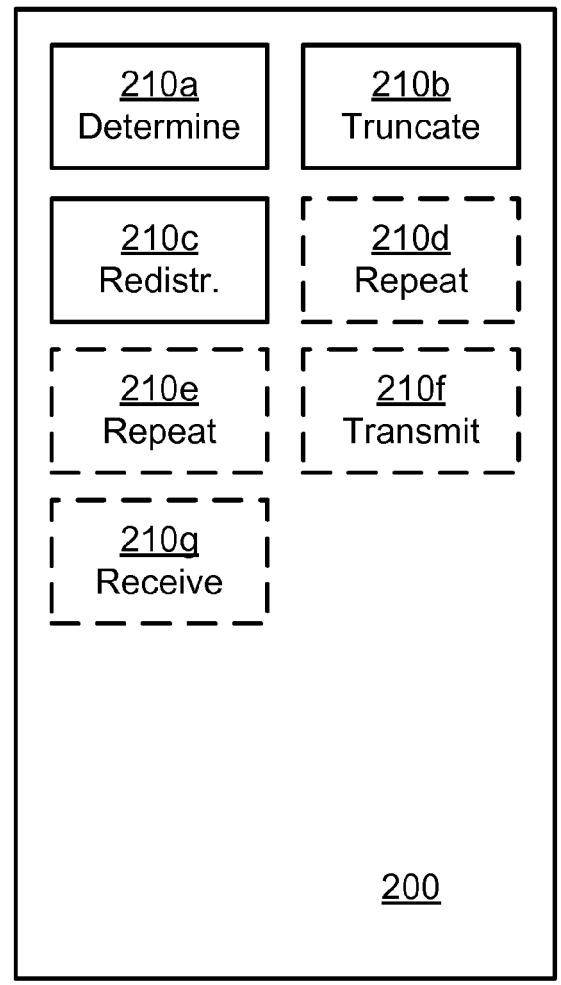
FIG. 9 is a schematic diagram showing functional modules of a control node according to an embodiment.

FIG. 9 schematically illustrates, in terms of a number of functional modules, the components of a control node 200 according to an embodiment. The control node 200 of FIG. 9 comprises a number of functional modules; a determine module 210a configured to perform step S102, a truncate module 210b configured to perform step S104, and a redistribute module 210c configured to perform step S106. The control node 200 of FIG. 9 may further comprise a number of optional functional modules, such as any of a first repeat module 210d configured to perform step S108, a second repeat module 210e configured to perform step S110, a transmit module 210f configured to perform step S112, and a receive module 210g configured to perform step S114. In general terms, each functional module 210a-210g may in one embodiment be implemented only in hardware and in another embodiment with the help of software, i.e., the latter embodiment having computer program instructions stored on the storage medium 230 which when run on the processing circuitry makes the control node 200 perform the corresponding steps mentioned above in conjunction with FIG.

9. It should also be mentioned that even though the modules correspond to parts of a computer program, they do not need to be separate modules therein, but the way in which they are implemented in software is dependent on the programming language used. Preferably, one or more or all functional modules 210a-210g may be implemented by the processing circuitry 210, possibly in cooperation with the communications interface 220 and/or the storage medium 230. The processing circuitry 210 may thus be configured to from the storage medium 230 fetch instructions as provided by a functional module 210a-210g and to execute these instructions, thereby performing any steps as disclosed herein.

The control node 200 may be provided as a standalone device or as a part of at least one further device. For example, the control node 200 may be provided in a node of the radio access network 110 or in a node of the core network 120 (as schematically illustrated in FIG. 1). Alternatively, functionality of the control node 200 may be distributed between at least two devices, or nodes.

These at least two nodes, or devices, may either be part of the same network part (such as the radio access network 110 or the core network 120) or may be spread between at least two such network parts. In general terms, instructions that are required to be performed in real time may be performed in a device, or node, operatively closer to the cell than instructions that are not required to be performed in real time. In this respect, at least part of the control node 200 may reside in the radio access network, such as in the radio access network node, for cases when embodiments as disclosed herein are performed in real time, for example where the beam pattern 150 needs to be adjusted in real time or near real time. In other aspects the control node 200 is provided in the terminal device 160.

Thus, a first portion of the instructions performed by the control node 200 may be executed in a first device, and a second portion of the of the instructions performed by the control node 200 may be executed in a second device; the herein disclosed embodiments are not limited to any particular number of devices on which the instructions performed by the control node 200 may be executed. Hence, the methods according to the herein disclosed embodiments are suitable to be performed by a control node 200 residing in a cloud computational environment. Therefore, although a single processing circuitry 210 is illustrated in FIG. 8 the processing circuitry 210 may be distributed among a plurality of devices, or nodes. The same applies to the functional modules 210a-210g of FIG. 9 and the computer program 1020 of FIG. 10.

Figure 10:
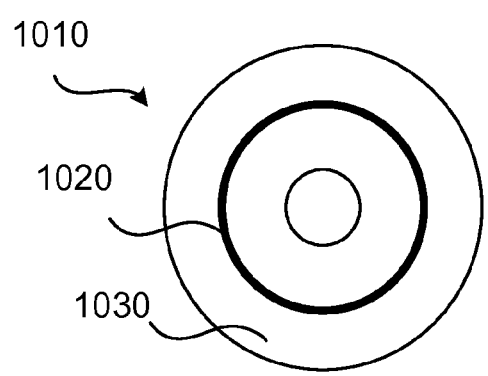
FIG. 10 shows one example of a computer program product comprising computer readable storage medium according to an embodiment.

FIG. 10 shows one example of a computer program product 1010 comprising computer readable storage medium 1030. On this computer readable storage medium 1030, a computer program 1020 can be stored, which computer program 1020 can cause the processing circuitry 210 and thereto operatively coupled entities and devices, such as the communications interface 220 and the storage medium 230, to execute methods according to embodiments described herein. The computer program 1020 and/or computer program product 1010 may thus provide means for performing any steps as herein disclosed.

In the example of FIG. 10, the computer program product 1010 is illustrated as an optical disc, such as a CD (compact disc) or a DVD (digital versatile disc) or a Blu-Ray disc. The computer program product 1010 could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program 1020 is here schematically shown as a track on the depicted optical disk, the computer program 1020 can be stored in any way which is suitable for the computer program product 1010.

Figure 11:
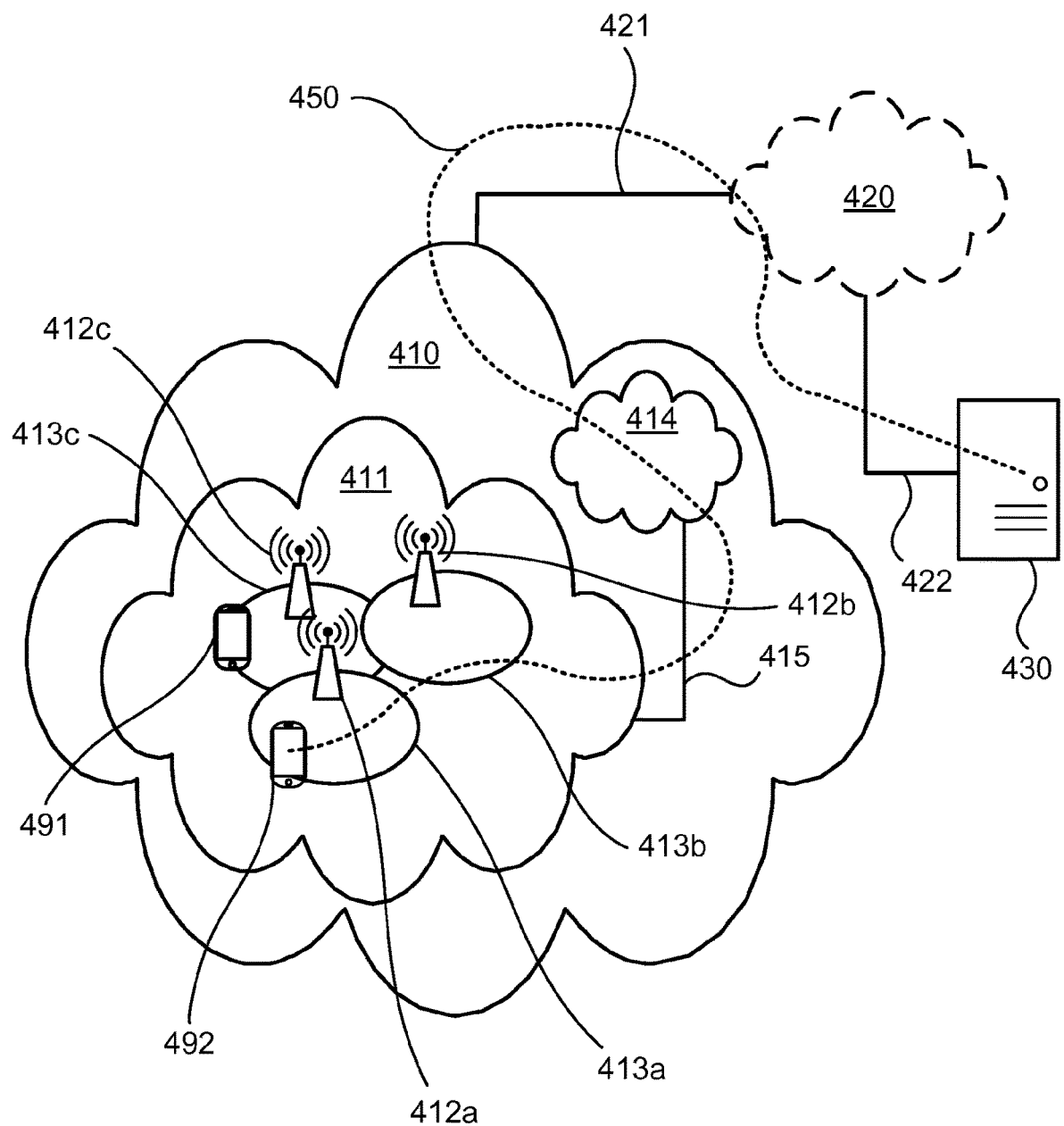
FIG. 11 is a schematic diagram illustrating a telecommunication network connected via an intermediate network to a host computer in accordance with some embodiments.

FIG. 11 is a schematic diagram illustrating a telecommunication network connected via an intermediate network to a host computer in accordance with some embodiments. In accordance with an embodiment, a communication system includes telecommunication network 410, such as a 3GPP-type cellular network, which comprises access network 411, such as radio access network 140 in FIG. 1, and core network 414, such as core network 120 in FIG. 1. Access network 411 comprises a plurality of radio access network nodes 412a, 412b, 412c, such as NBs, eNBs, gNBs (each corresponding to the radio access network node 140 of FIG. 1) or other types of wireless access points, each defining a corresponding coverage area, or cell, 413a, 413b, 413c.

Each radio access network nodes 412a, 412b, 412c is connectable to core network 414 over a wired or wireless connection 415. A first UE 491 located in coverage area 413c is configured to wirelessly connect to, or be paged by, the corresponding network node 412c. A second UE 492 in coverage area 413a is wirelessly connectable to the corresponding network node 412a. While a plurality of UE 491, 492 are illustrated in this example, the disclosed embodiments are equally applicable to a situation where a sole UE is in the coverage area or where a sole terminal device is connecting to the corresponding network node 412. The UEs 491, 492 correspond to the terminal device 160 of FIG. 1.

Telecommunication network 410 is itself connected to host computer 430, which may be embodied in the hardware and/or software of a standalone server, a cloud-implemented server, a distributed server or as processing resources in a server farm. Host computer 430 may be under the ownership or control of a service provider, or may be operated by the service provider or on behalf of the service provider. Connections 421 and 422 between telecommunication network 410 and host computer 430 may extend directly from core network 414 to host computer 430 or may go via an optional intermediate network 420. Intermediate network 420 may be one of, or a combination of more than one of, a public, private or hosted network; intermediate network 420, if any, may be a backbone network or the Internet; in particular, intermediate network 420 may comprise two or more subnetworks (not shown).

The communication system of FIG. 11 as a whole enables connectivity between the connected UEs 491, 492 and host computer 430. The connectivity may be described as an over-the-top (OTT) connection 450. Host computer 430 and the connected UEs 491, 492 are configured to communicate data and/or signaling via OTT connection 450, using access network 411, core network 414, any intermediate network 420 and possible further infrastructure (not shown) as intermediaries. OTT connection 450 may be transparent in the sense that the participating communication devices through which OTT connection 450 passes are unaware of routing of uplink and downlink communications. For example, network node 412 may not or need not be informed about the past routing of an incoming downlink communication with data originating from host computer 430 to be forwarded (e.g., handed over) to a connected UE 491. Similarly, network node 412 need not be aware of the future routing of an outgoing uplink communication originating from the UE 491 towards the host computer 430.

Figure 12:
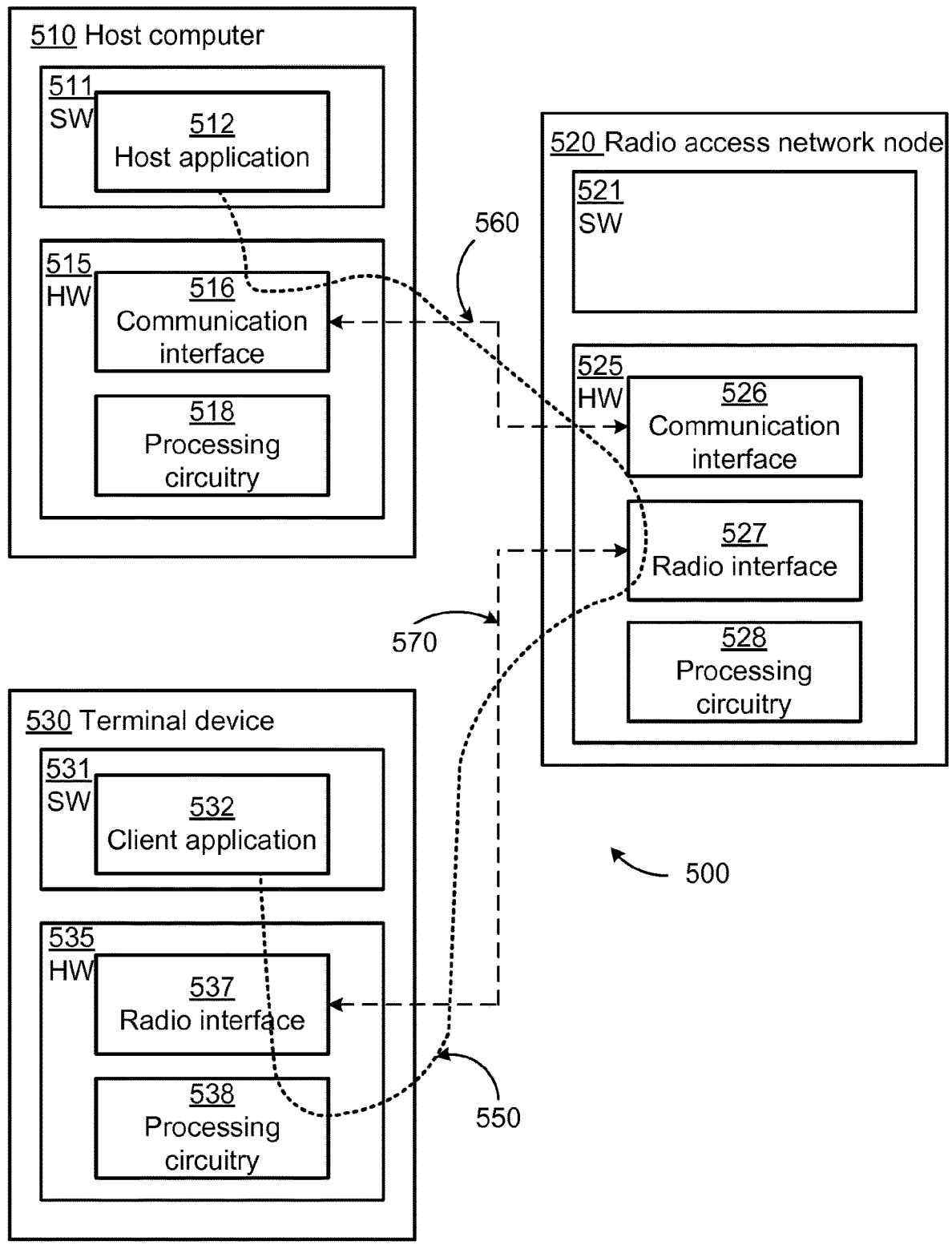
FIG. 12 is a schematic diagram illustrating host computer communicating via a radio base station with a terminal device over a partially wireless connection in accordance with some embodiments.

FIG. 12 is a schematic diagram illustrating host computer communicating via a radio access network node with a UE over a partially wireless connection in accordance with some embodiments. Example implementations, in accordance with an embodiment, of the UE, radio access network node and host computer discussed in the preceding paragraphs will now be described with reference to FIG. 12. In communication system 500, host computer 510 comprises hardware 515 including communication interface 516 configured to set up and maintain a wired or wireless connection with an interface of a different communication device of communication system 500. Host computer 510 further comprises processing circuitry 518, which may have storage and/or processing capabilities. In particular, processing circuitry 518 may comprise one or more programmable processors, application-specific integrated circuits, field programmable gate arrays or combinations of these (not shown) adapted to execute instructions. Host computer 510 further comprises software 511, which is stored in or accessible by host computer 510 and executable by processing circuitry 518. Software 511 includes host application 512. Host application 512 may be operable to provide a service to a remote user, such as UE 530 connecting via OTT connection 550 terminating at UE 530 and host computer 510. The UE 530 corresponds to the terminal device 160 of FIG. 1. In providing the service to the remote user, host application 512 may provide user data which is transmitted using OTT connection 550.

Communication system 500 further includes radio access network node 520 provided in a telecommunication system and comprising hardware 525 enabling it to communicate with host computer 510 and with UE 530. The radio access network node 520 corresponds to the radio access network node 140 of FIG. 1. Hardware 525 may include communication interface 526 for setting up and maintaining a wired or wireless connection with an interface of a different communication device of communication system 500, as well as radio interface 527 for setting up and maintaining at least wireless connection 570 with UE 530 located in a coverage area (not shown in FIG. 12) served by radio access network node 520. Communication interface 526 may be configured to facilitate connection 560 to host computer 510. Connection 560 may be direct or it may pass through a core network (not shown in FIG. 12) of the telecommunication system and/or through one or more intermediate networks outside the telecommunication system. In the embodiment shown, hardware 525 of radio access network node 520 further includes processing circuitry 528, which may comprise one or more programmable processors, application-specific integrated circuits, field programmable gate arrays or combinations of these (not shown) adapted to execute instructions. Radio access network node 520 further has software 521 stored internally or accessible via an external connection.

Communication system 500 further includes UE 530 already referred to. Its hardware 535 may include radio interface 537 configured to set up and maintain wireless connection 570 with a radio access network node serving a coverage area in which UE 530 is currently located. Hardware 535 of UE 530 further includes processing circuitry 538, which may comprise one or more programmable processors, application-specific integrated circuits, field programmable gate arrays or combinations of these (not shown) adapted to execute instructions. UE 530 further comprises software 531, which is stored in or accessible by UE 530 and executable by processing circuitry 538. Software 531 includes client application 532. Client application 532 may be operable to provide a service to a human or non-human user via UE 530, with the support of host computer 510. In host computer 510, an executing host application 512 may communicate with the executing client application 532 via OTT connection 550 terminating at UE 530 and host computer 510. In providing the service to the user, client application 532 may receive request data from host application 512 and provide user data in response to the request data. OTT connection 550 may transfer both the request data and the user data. Client application 532 may interact with the user to generate the user data that it provides.

It is noted that host computer 510, radio access network node 520 and UE 530 illustrated in FIG. 12 may be similar or identical to host computer 430, one of network nodes 412a, 412b, 412c and one of UEs 491, 492 of FIG. 11, respectively. This is to say, the inner workings of these entities may be as shown in FIG. 12 and independently, the surrounding network topology may be that of FIG. 11.

In FIG. 12, OTT connection 550 has been drawn abstractly to illustrate the communication between host computer 510 and UE 530 via network node 520, without explicit reference to any intermediary devices and the precise routing of messages via these devices. Network infrastructure may determine the routing, which it may be configured to hide from UE 530 or from the service provider operating host computer 510, or both. While OTT connection 550 is active, the network infrastructure may further take decisions by which it dynamically changes the routing (e.g., on the basis of load balancing consideration or reconfiguration of the network).

Wireless connection 570 between UE 530 and radio access network node 520 is in accordance with the teachings of the embodiments described throughout this disclosure. One or more of the various embodiments improve the performance of OTT services provided to UE 530 using OTT connection 550, in which wireless connection 570 forms the last segment. More precisely, the teachings of these embodiments may reduce interference, due to improved classification ability of airborne UEs which can generate significant interference.

A measurement procedure may be provided for the purpose of monitoring data rate, latency and other factors on which the one or more embodiments improve. There may further be an optional network functionality for reconfiguring OTT connection 550 between host computer 510 and UE 530, in response to variations in the measurement results. The measurement procedure and/or the network functionality for reconfiguring OTT connection 550 may be implemented in software 511 and hardware 515 of host computer 510 or in software 531 and hardware 535 of UE 530, or both. In embodiments, sensors (not shown) may be deployed in or in association with communication devices through which OTT connection 550 passes; the sensors may participate in the measurement procedure by supplying values of the monitored quantities exemplified above, or supplying values of other physical quantities from which software 511, 531 may compute or estimate the monitored quantities. The reconfiguring of OTT connection 550 may include message format, retransmission settings, preferred routing etc.; the reconfiguring need not affect network node 520, and it may be unknown or imperceptible to radio access network node 520. Such procedures and functionalities may be known and practiced in the art. In certain embodiments, measurements may involve proprietary UE signaling facilitating host computer's 510 measurements of throughput, propagation times, latency and the like. The measurements may be implemented in that software 511 and 531 causes messages to be transmitted, in particular empty or 'dummy' messages, using OTT connection 550 while it monitors propagation times, errors etc.

The inventive concept has mainly been described above with reference to a few embodiments. However, as is readily appreciated by a person skilled in the art, other embodiments than the ones disclosed above are equally possible within the scope of the inventive concept, as defined by the appended patent claims.

The invention claimed is:

1. A method for reshaping individual beams of a beam pattern, the method being performed by a control node, the method comprising:
   determining the beam pattern by distributing available transmission energy in individual beams according to a weighted combination of the individual beams, wherein different weights are applied for at least two of the individual beams, and wherein the weighted combination of the individual beams is based on radio propagation channel properties;
   truncating transmission energy of the individual beam with a highest transmission energy in the beam pattern to not be over a threshold; and
   redistributing the truncated transmission energy among remaining individual beams in the beam pattern other than the individual beam with the highest transmission energy, thereby reshaping the individual beams of the beam pattern; and
   wherein the remaining individual beams, according to the beam pattern, have transmission energies distributed according to a transmission energy ratio, and
   wherein the transmission energy is redistributed among the remaining individual beams to preserve the transmission energy ratio of these remaining individual beams.

2. The method according to claim 1, wherein the transmission energy is redistributed among the remaining individual beams such that the truncated transmission energy is added to those remaining beams not having their transmission energy over the threshold and such that none of the truncated transmission energy is added to any remaining individual beam having transmission energy above the threshold.

3. The method according to claim 1, further comprising:
   repeating the steps of truncating transmission energy and redistributing the truncated transmission energy until no individual beam in the beam pattern has its transmission energy larger than the threshold.

4. The method according to claim 1, further comprising:
   when any of the remaining individual beams of the beam pattern has transmission energy above the threshold, repeating the steps of truncating transmission energy and redistributing the truncated transmission energy but with a strongest remaining individual beam as strongest beam, and without considering any individual beam for which the transmission energy was previously truncated.

5. The method according to claim 1, wherein, when determining the beam pattern, the available transmission energy is distributed among the individual beams according to maximum ratio transmission (MRT) or eigen beamforming, or minimum mean square error (MMSE) beamforming.

6. The method according to claim 1, wherein the beam pattern is determined for transmission of signals in an unlicensed frequency band.

7. The method according to claim 1, wherein the threshold is defined in terms of maximum allowed transmit power density.

8. The method according to claim 1, wherein the threshold is defined in terms of one of the following: limitation of equivalent isotropic radiated power, electromagnetic field constraints, electromagnetic compatibility constraints, electromagnetic radiation constraints, or International Commission on Non-Ionizing Radiation Protection constraints.

9. The method according to claim 1, wherein the radio propagation channel properties are represented by a complete set of complex coefficients and angles of signal paths of a radio propagation channel.

10. The method according to claim 1, wherein the radio propagation channel properties are represented by an estimate of at least one measurement of the radio propagation channel.

11. The method according to claim 1, further comprising:
    initiating transmission of a signal using the beam pattern after having redistributed the truncated transmission energy.

12. The method according to claim 1, further comprising:
    initiating reception of a signal using the beam pattern after having redistributed the truncated transmission energy.

13. A control node for reshaping individual beams of a beam pattern, the control node comprising processing circuitry, the processing circuitry being configured to cause the control node to:
    determine the beam pattern by distributing available transmission energy in individual beams according to a weighted combination of the individual beams, wherein different weights are applied for at least two of the individual beams, and wherein the weighted combination of individual beams is based on radio propagation channel properties;
    truncate transmission energy of the individual beam with a highest transmission energy in the beam pattern to not be over a threshold; and
    redistribute the truncated transmission energy among remaining individual beams in the beam pattern other than the individual beam with the highest transmission energy, thereby reshaping the individual beams of the beam pattern; and
    wherein the remaining individual beams, according to the beam pattern, have transmission energies distributed according to a transmission energy ratio, and
    wherein the transmission energy is redistributed among the remaining individual beams to preserve the transmission energy ratio of these remaining individual beams.

14. The control node according to claim 13, further being configured to:
    repeat truncating transmission energy and redistributing the truncated transmission energy until no individual beam in the beam pattern has its transmission energy larger than the threshold.

15. The control node according to claim 13, further being configured to:
    when any of the remaining individual beams of the beam pattern has transmission energy above the threshold, repeating truncating transmission energy and redistributing the truncated transmission energy but with a strongest remaining individual beam as strongest beam, and without considering any individual beam for which the transmission energy was previously truncated.

16. The control node according to claim 13, further being configured to:

transmit a signal using the beam pattern after having redistributed the truncated transmission energy.

17. The control node according to claim 13, further being configured to:
receive a signal using the beam pattern after having redistributed the truncated transmission energy.

18. A non-transitory, computer-readable medium storing computer code that, when executed on processing circuitry of a control node, causes the control node to:
determine a beam pattern by distributing available transmission energy in individual beams according to a weighted combination of the individual beams, wherein different weights are applied for at least two of the individual beams, and wherein the weighted combination of individual beams is based on radio propagation channel properties;
truncate transmission energy of the individual beam with a highest transmission energy in the beam pattern to not be over a threshold; and
redistribute the truncated transmission energy among remaining individual beams in the beam pattern other than the individual beam with the highest transmission energy, thereby reshaping the individual beams of the beam pattern; and
wherein the remaining individual beams, according to the beam pattern, have transmission energies distributed according to a transmission energy ratio, and
wherein the transmission energy is redistributed among the remaining individual beams to preserve the transmission energy ratio of these remaining individual beams.

* * * * *